United States Patent [19]
Wang et al.

[11] Patent Number: 6,104,371
[45] Date of Patent: *Aug. 15, 2000

[54] MODULAR, HIGH-INTENSITY FIBER OPTIC BACKLIGHT FOR COLOR DISPLAYS

[75] Inventors: Ting Wang; Wanna Huang, both of Princeton, N.J.

[73] Assignee: NEC Research Institute, Inc., Princeton, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/862,908

[22] Filed: May 23, 1997

Related U.S. Application Data

[60] Provisional application No. 60/040,661, Mar. 10, 1997.

[51] Int. Cl.$^7$ .................................................. G09G 3/36
[52] U.S. Cl. ........................... 345/102; 345/32; 385/137; 385/901
[58] Field of Search ........................... 345/32, 101, 102; 362/32; 349/159; 385/115, 137, 901

[56] References Cited

U.S. PATENT DOCUMENTS

| | | |
|---|---|---|
| 3,931,518 | 1/1976 | Miller . |
| 3,936,631 | 2/1976 | Muska . |
| 3,982,123 | 9/1976 | Goell et al. . |
| 4,234,907 | 11/1980 | Daniel ........................................ 362/32 |
| 4,519,017 | 5/1985 | Daniel ........................................ 362/32 |
| 4,799,050 | 1/1989 | Prince et al. ............................... 345/32 |
| 4,845,596 | 7/1989 | Mouissie .................................... 362/32 |
| 4,885,663 | 12/1989 | Parker ........................................ 362/32 |
| 5,013,128 | 5/1991 | Stern et al. ............................... 385/115 |
| 5,037,172 | 8/1991 | Hekman et al. ........................... 385/31 |
| 5,042,892 | 8/1991 | Chiu et al. ................................ 385/114 |
| 5,097,396 | 3/1992 | Myers ........................................ 362/32 |
| 5,181,130 | 1/1993 | Hubby, Jr. .................................. 359/42 |

(List continued on next page.)

FOREIGN PATENT DOCUMENTS

WO 90/02349   3/1990   WIPO .

OTHER PUBLICATIONS

F. Suzuki, "Novel plastic image–transmitting fiber," *SPIE*, vol. 1592, Plastic Optical Fibers, pp. 150–157 (1991).

G. Brun et al., "Plastic Optical Fiber for Lateral Illumination: Chemical Studies and Optical Measurements," Proc. 4$^{th}$ Int'l. Conf. Plastic Optical Fibers & Applications, Boston, MA, Oct. 17–19, pp. 187–192 (1995).

J. Farenc et al., "Illumination, Signalisation, and Decoration Using Plastic Optical Fibers," Proc. 4$^{th}$ Conf. Plastic Optical Fibers & Applications, Boston, MA, Oct. 17–19, pp. 203–205 (1995).

S. Sottini et al., "Optical Fiber–Polymer Guide Coupling by a Tapered Graded Index Glass Guide," *IEEE Journal of Quantum Electronics*, vol. 31, No. 6, pp. 1123–1130 (1995).

D. J. Ripin et al., "High efficiency side–coupling of light into optical fibers using imbedded v–grooves," *Electronics Letters*, vol. 31, No. 25, pp. 2204–2205 (1995).

Y. Li et al, "Distribution of Light Power and Optical Signals Using Embedded Mirrors Inside Polymer Optical Fibers," *IEEE Photonics Technology Letters*, vol. 8, No. 10, pp. 1352–1354 (1996).

*Primary Examiner*—Dennis-Doon Chow
*Assistant Examiner*—Amr Awad
*Attorney, Agent, or Firm*—Jeffrey J. Brosemer; Andrew G. Isztwan

[57] ABSTRACT

A modular, high-intensity fiber optic color backlight for color displays wherein light is distributed to the display through side-emitting optical fibers. The optical fibers are ordered into an array of channels, wherein each channel contains a number of optical fibers. Each of the individual channels are separated by reflective channel isolators and each channel preferably carries light of a single color. Light detecting fibers are optionally installed in the module so that intensity data may be collected. Each module includes a mechanical and electrical interconnect so that individual modules may be combined, thereby producing displays of arbitrary size.

37 Claims, 7 Drawing Sheets

OTHER PUBLICATIONS

| | | | |
|---|---|---|---|
| 5,187,765 | 2/1993 | Muehlmann et al. | 385/115 |
| 5,301,090 | 4/1994 | Hed | 362/32 |
| 5,307,057 | 4/1994 | Cook et al. | 340/815.42 |
| 5,307,245 | 4/1994 | Myers et al. | 362/32 |
| 5,329,388 | 7/1994 | Yoshimizu | 359/53 |
| 5,432,876 | 7/1995 | Apperldorn et al. . | |
| 5,442,467 | 8/1995 | Silverstein et al. | 349/159 |
| 5,461,548 | 10/1995 | Esslinger et al. | 362/32 |
| 5,479,328 | 12/1995 | Lee et al. | 362/216 |
| 5,542,016 | 7/1996 | Kaschke | 385/123 |
| 5,568,964 | 10/1996 | Parker et al. | 362/32 |
| 5,673,344 | 9/1997 | Li et al. . | |
| 5,781,679 | 7/1998 | Li et al. . | |

MODULAR, HIGH-INTENSITY FIBER OPTIC BACKLIGHT FOR COLOR DISPLAYS

This Application claims the benefit of U.S. Provisional Application No. 60/040,661, filed Mar. 10, 1997.

FIELD OF THE INVENTION

The invention relates generally to liquid crystal color display systems and more specifically to a high-intensity, color backlight for enhanced color displays.

BACKGROUND OF THE INVENTION

Computers and other devices requiring a visual interface often use liquid crystal displays (LCDs) to display data. Recently, color LCDs utilizing active matrix and passive matrix technologies have become commonplace. Display systems employing either of these technologies require light from a backlight to generate the colors displayed to a user. In such systems, the backlight generates an image plane of light beneath the LCD, which in turn generates the color display.

As is known in the art, LCD technologies transmit only a small portion of the light generated by the backlight. The intensity of display systems incorporating these technologies therefore depend largely upon the intensity of the backlight. Therefore, to have a high-intensity image transmitted to the user, the backlight must be substantially brighter than a desired viewer intensity.

The need for a high-intensity backlight is hightened when one considers that special filters are often applied to the front of LCD displays to prevent "washing out" of the display where large amounts of ambient light are present such as outdoors in high-intensity, bright sun light. Such filters further reduce the amount of light transmitted to the user thereby necessitating very bright backlights for such applications.

Unfortunately, such high-intensity backlights generate a large amount of heat which oftentimes causes problems with the operation of the LCDs. As is known in the art, LCDs operate over a relatively narrow range of operating temperatures. If the LCDs are operated outside of this range, they may completely and irreversibly fail. Consequently, any high-intensity backlight contemplated for use within a LCD must not heat the LCD outside of its narrow range of operation.

Furthermore, a backlight must be lightweight and possess a low profile. Since many present day applications of LCDs are mobile, portable, lightweight, and low profile are very desirable attributes of a backlight for a display. Additionally, a backlight must have a long lifetime and provide a uniform emission of light across its display surface. Finally, a backlight must emit light in wavelengths required by the LCDs employed in the display and provide that light to the LCDs.

In summary, desirable backlights for display systems should be cool in operation but output high-intensity light, have a low profile, a low mass, a long lifetime, have a high uniformity and must emit light in the required wavelengths.

Prior art backlights and related technologies do not generally offer all of these desirable attributes. Specifically, U.S. Pat. No. 4,479,328 discloses a backlight having a serpentine fluorescent tube nested in a shaped reflector. Light emitted from the fluorescent tube is both emitted to an image plane and the shaped reflector. The reflector reflects a portion of the light to the image plane in such a manner that a very bright and uniform image is formed at the image plane. As stated by the patentees there, fiber optic backlights are very expensive, very bulky, and have a high power consumption. Nevertheless, the prior art is replete with many such devices.

U.S. Pat. No. 5,037,172 issued to Hekman et al. on Aug. 6, 1991 for a Fiber Optic Device with a Reflective Notch Coupler discloses a structure and method for manufacturing a reflective notch coupler for an optical fiber. The coupler is formed in an optical fiber by a pair of angled surfaces extending from the cladding of the optical fiber and meeting in the fiber's core to form an indentation in the fiber. One of the surfaces is reflectively coated and couples light into and out of the core of the optical fiber. When light traverses the core of the fiber and encounters the reflective surface, it is reflected out of the fiber in a direction substantially perpendicular to the fiber. Variations of such a side-emitting optical fiber have been used as an illumination device in a variety of displays.

U.S. Pat. No. 4,845,596 describes an illumination device for producing illumination of a surface, comprising several parallel optical conductors which are placed above an optically reflecting surface, and whose reflecting outside sheath is removed locally at least in such a way that the light thereby emerging from the optical conductor is reflected by the reflecting surface to the surface to be illuminated. The optical conductors are spaced at such intervals and at such a distance above the reflecting surface that the light reflected by the reflecting surface can reach the surface to be illuminated on the other side of the optical conductors through the space between the optical conductors in such a way that a uniform illumination of the surface is obtained.

U.S. Pat. No. 4,234,907 discloses a light emitting fabric in which optical fibers are part of the fabric weave, replacing some of the threaded fibers. The fabric uniformly illuminates light which is accordingly decorated. The individual optical fibers are gathered into a bundle at one end of the fabric and illuminated by a light source. Light traveling through the fibers is emitted in small amounts throughout the lengths thereof through small scratches that pierce the outer coating. Uniformity and intensity of the light are enhanced by providing a reflective coating on the non-illuminated ends of the optical fibers.

U.S. Pat. No. 5,187,765 discloses a light emitting panel backlighted by an optical fiber assembly in which individual optical fibers are positioned in parallel across the bottom of a frame and transverse notches are scored in the cladding so as to permit lateral emissions of light along the length of the fibers. In a preferred embodiment, the lateral emissions are projected onto a diffusing plate mounted in the top of the frame to provide uniform illumination throughout the entire area of the light emitting panel. Increased light throughput is obtained by inducing air flow at the end of the optical fiber bundle to keep the end surface cool by removing the heat from light energy impinging upon the end.

U.S. Pat. No. 5,097,396 issued to Meyers on Mar. 17, 1992 for a Fiber Optic Backlighting Panel describes a fiber optic panel for providing backlighting in devices such as rubber keypads, membrane switches, liquid crystal displays, rigid panels and the like. The fiber optic panel comprises a light source for emitting light and a fiber optic cable which transmits the light to a plurality of locations throughout the device. The fiber optic cable includes a plurality of optical fibers, each of which individually terminates at one of a plurality of locations to illuminate that location or, alternatively at spaced locations throughout the device to illuminate a region of the device uniformly.

U.S. Pat. No. 5,307,245 extends the teaching of the above U.S. Pat. No. 5,097,396 fiber optic panel so as to provide uniform and increased background illumination in backlight devices. The fiber optic panel includes a light source and a layer of optical fibers arranged adjacent to each other, which transmit light to different locations throughout the device, thereby providing efficient background illumination. The optical fibers are selectively terminated at locations by forming a series of angular cuts through the layer of optical fibers in a zig-zag pattern. The zig-zag pattern extends across the length and width of the panel such that each optical fiber is cut only once so as to provide increased and constant illumination throughout the device. In a specific embodiment, for application with liquid crystal displays, a layer of foam is used to diffuse the light to further provide uniform illumination.

A Fiber Optic Light Emitting Panel was disclosed in U.S. Pat. No. 5,568,964 which included one or more light emitting layers that are sealed along side edges and/or an end edge. A thin film, sheet or coating is applied to one or both sides of the light emitting portions of the panel assembly. If a more brighter and/or more uniform emission of light is desired, two or more panels may be joined together. Typical applications of such a panel include backlighting of liquid crystal displays, membrane switches, alphanumeric displays and the like.

A Light Emitting Optical Fiber Assembly was disclosed in U.S. Pat. No. 4,519,017 wherein the light emitting optical fiber assemblies include light emitting panels that employ a nonwoven geometric grid of light emitting optical fibers. The fibers are arranged so as to permit air to pass through or define apertures providing access through the panel. The nonwoven grids can be arranged to permit the panels to be cut or sectioned without losing all light emitting capacity. Panels are provided with optical fibers that have been encapsulated with light transmitting laminate, and the laminate is imparted with a light scattering formulation which permits light to be emitted from the encapsulated layer.

U.S. Pat. No. 5,042,892 for a Fiber Optic Light Panel discloses a light emitting panel formed by a single layer of parallel and contiguously arranged, clad optical fibers supplied with light from a source at one end of the panel. The fibers are cemented together and the cladding is removed from the light emitting surface of the panel. In a particular embodiment, each fiber is looped at the end of the panel remote from the source of light so that both ends of each fiber is connected to the source of light.

A Fiber Optic Display System Utilizing a Dual Light Source was described in U.S. Pat. No. 5,307,057 issued to Cook et al. on Apr. 26, 1994. There, a fiber optic display sign having a plurality of magnetically actuable indicator elements each having associated therewith at least two fiber optic cables for transmitting light. Each of the fiber optic cables has an end face for emitting light which terminates in an indicator element, and an end face for receiving light which is positioned in close proximity with the other light receiving end faces to form a light receiving surface. A light source assembly is movably related to the light receiving surface and includes a primary light and a secondary light.

U.S. Pat. No. 5,329,388 discloses a liquid crystal display system constructed from a plurality of liquid crystal display cells stacked one on top of another. A light guide adapted to transmit light only in a direction perpendicular to the display surfaces of the liquid crystal display cells, is interposed between the first liquid crystal display cells nearest to an observer and the second liquid crystal display disposed behind the first liquid crystal display cell. Because of the provision of the light guide, the images formed on the second and third liquid crystal display cells are focused through the light guide onto the rear surface of the first liquid crystal display cell, viewed from the direction of the observer. The light guide is a sheet of optical fibers or a stack of sheet like members separated by reflection films, the plane of which are perpendicular to the plane of the display.

U.S. Pat. No. 5,181,130 describes a fiber optic faceplate liquid crystal display which includes a layer of liquid crystal material, a thin transparent layer, one or more polarizers, and a fiber optic faceplate. The fiber optic faceplate serves to allow ambient light from a much wider range of incident angles to illuminate the LCD than would be the case with prior art LCDs, and allows the viewer to position himself so as to avoid front surface glare and still see the display brightly illuminated, even in difficult lighting situations.

Yet while a number of prior-art systems and techniques exist for providing a backlight for liquid crystal displays, each of the prior art systems and techniques suffer from one or more infirmities It is desirable therefore, and a continuing need exists in the art for backlighting systems and techniques which are cool in operation, output high-intensity light, have a low profile, a low mass, a long lifetime, and have a high uniformity while emitting light in the required wavelengths.

SUMMARY OF THE INVENTION

The present invention is directed to a high-intensity, fiber optic color backlight module for color displays. The fiber optic backlight module -advantageously provides light of uniform increased brightness, while at the same time being low profile, low weight having a low power consumption while efficiently dissipating generating heat.

In one aspect of the present invention, the high-intensity fiber optic color backlight module for color displays comprises a plurality of side-emitting optical fibers arranged in an array and separated by light isolators. Advantageously, the array of fibers may be stacked, so that emitted light of increased intensity is possible.

In another aspect of the present invention, the high-intensity fiber optic color backlight module is capable of combination with other backlight modules, so that backlight displays of arbitrary size are possible.

In yet another aspect of the present invention, the high-intensity fiber optic color backlight module incorporates a novel light detecting fiber that allows the detection of light emitted from the high-intensity module. Further, the module is constructed so that a variety of light shutters may be placed over the backlight, thereby permitting the selective emission of light. Finally, the module has incorporated cooling channels, which permit the extended, cool operation of the highintensity device.

Further advantages and features of the present invention will become apparent by reference to the drawing.

The drawings are not necessarily to scale.

DETAILED DESCRIPTION

A preferred embodiment of the invention will now be described while referring to the figures, several of which may be simultaneously referred to during the course of the following description.

Figure 1A:
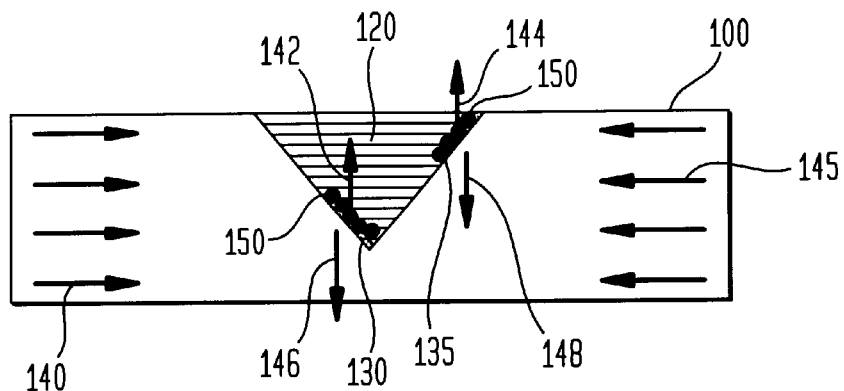
FIG. 1A is a cut-away view of a POF showing light dispersive micro-mirrors formed inside.

Referring now to FIG. 1A, there is shown a cut-away view of an optical assembly used in the construction of the present invention. Polymer optical fiber (POF) 100, which is well known in the art, is depicted having light 140, 145 traversing a length of the POF from opposite directions. Cut and refilled region 120 is shown containing a number of internal mirrors 130, 135. The cut and refilled region containing the internal mirrors may be preferably constructed through a series of micro-cutting, masking, coating and refilling operations.

The light traversing the POF will be deflected upon striking one of the internal mirrors. For example, light 140 traversing a length of POF is deflected as shown by arrows 146 and 144 upon striking mirrors 130 and 135 respectively. Similarly, the deflection of light 145 is shown by arrows 142 and 148 when the light strikes mirrors 130 and 135 respectively. Advantageously, the cut and refilled region serves as a port or tap, thereby allowing light 142 and 144 to exit the POF. Those skilled in the art will readily recognize that the port may be bidirectional, and light may be injected through the side of the fiber as well. In such a case, the injected light strikes the mirror and then propagates through a length of the fiber for distribution or subsequent tapping by another tap.

An extension to the above described side emitting optical fiber which is useful for the purpose of the present invention is a controllable, light dispersive optical fiber which is described in a pending United States Patent Application entitled "Light Dispersive Optical Fiber", assigned to the present assignee and incorporated herein by reference. Specifically, and referring once again to FIG. 1A, there is shown a cut-away view of an optical assembly in accordance with a preferred embodiment of the present invention. Polymer optical fiber (POF) 100, which is well known in the art, is depicted having light 140, 145 traversing a length of the POF from opposite directions. Cut and refilled region 120 is shown containing a number of internal mirrors 130, 135. The cut and refilled region containing the internal mirrors may be preferably constructed through a series of micro-cutting, masking, coating and refilling operations. As shown in this Figure, each of the mirrors has dispersive elements 150, incorporated thereon.

The light traversing the POF will be deflected upon striking one of the internal mirrors. For example, light 140 traversing a length of POF is deflected as shown by arrows 146 and 144 upon striking mirrors 130 and 135 respectively. Due to the presence of the dispersive elements 150, the light which strikes the mirrors is dispersively reflected. Similarly, the deflection of light 145 is shown by arrows 142 and 148 when the light strikes mirrors 130 and 135 respectively. Advantageously, the cut and refilled region serves as a port or tap, thereby allowing diffused light 142 and 144 to exit the POF. Those skilled in the art will readily recognize that the port may be bidirectional, and light may be injected through the side of the fiber as well. In such a case, the injected light strikes the mirror and then propagates through a length of the fiber for distribution or subsequent tapping by another tap.

Figure 1B:
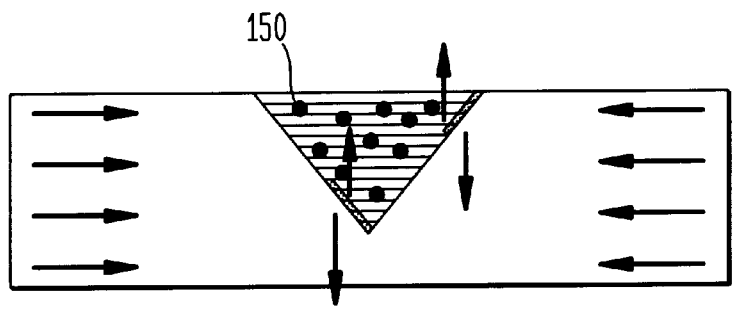
FIG. 1B is a cut away view of a POF showing light dispersive elements within a cut and refilled region.

With reference now to FIG. 1B, there is shown an alternative embodiment of the present invention. Specifically, dispersive elements are added to the refilling material before the material is placed within the cut region of the optical fiber. In this manner, modifications to the mirrors need not be performed, and the nature, concentration and placement of the dispersive elements within the refilling material may be selectively varied thereby permitting a wide range of dispersive characteristics for the finished side-emitting fiber.

At this point those skilled in the art will quickly recognize that a wide variety of dispersive elements may be used. In particular, the dispersive elements may be of a type which cause either refraction or reflection of light. For example, the elements may be small granules of transparent material that have an index of refraction that differs from the core of the optical fiber. Examples of such materials include different polymers, plastics, glass, quartz or air bubbles. Reflective granules may consist of metals or other materials or a combination. Additionally, the elements may be of any shape, i.e., spherical, flakes or many faceted.

Further, the light dispersive elements may be formed on a surface of the mirrors. For example, chemical treatment with an appropriate chemical or solvent, will effectively "frost" the surface of the mirror thereby creating the dispersive elements. Additionally, mechanical treatment such as abrating or "blasting" the surface of the mirror will also create the dispersive elements.

Figure 1C:
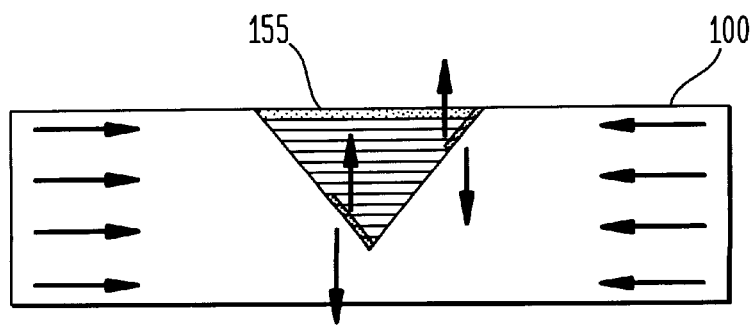
FIG. 1C is a cut-away view of a POF showing a light shutter within the cut and refilled region for controllably emitting light.
Figure 1D:
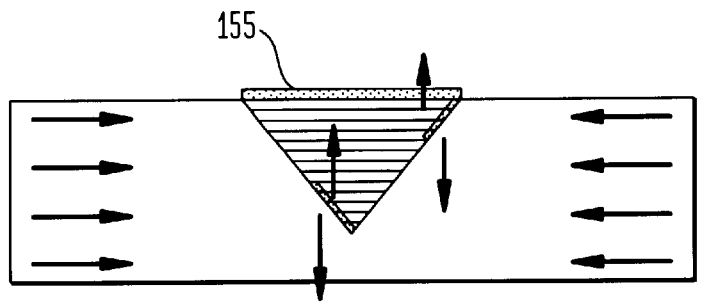
FIG. 1D is a cut-away view of a POF showing a light shutter within and covering the cut and refilled region for controllably emitting light.

An additional embodiment of the present invention is shown in FIG. 1C. There, optical fiber assembly 100, has a light shutter 155 placed within the refilled region of the cut and refilled optical fiber. The light shutter selectively permits the transmission of light. Consequently, light reflected from internal mirrors must pass through the shutter before exiting the fiber. If the shutter is in a transparent mode, the light passes and exits the fiber. Conversely, if the shutter is in an opaque mode, the light cannot pass. Variations of the shutter are possible such that a degree of transmittance between the transparent and opaque modes are controllable. Alternatively, and as shown in FIG. 1D, the light shutter may be placed in such a manner as to cover the cut region by bonding to a side of the fiber. Such an arrangement simplifies manufacture.

Figure 1E:
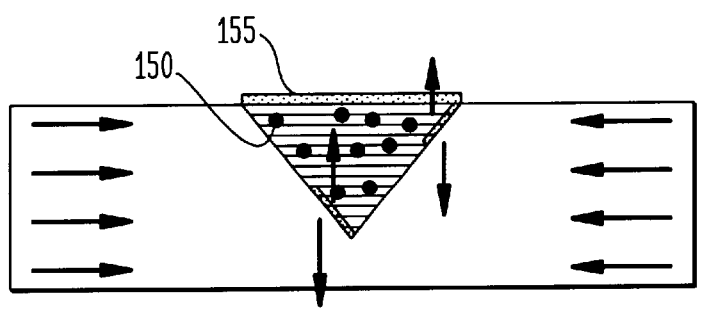
FIG. 1E is a cut-away view of a POF showing a light shutter within and covering the cut and refilled region containing light dispersive elements, for controllably emitting light.
Figure 1F:
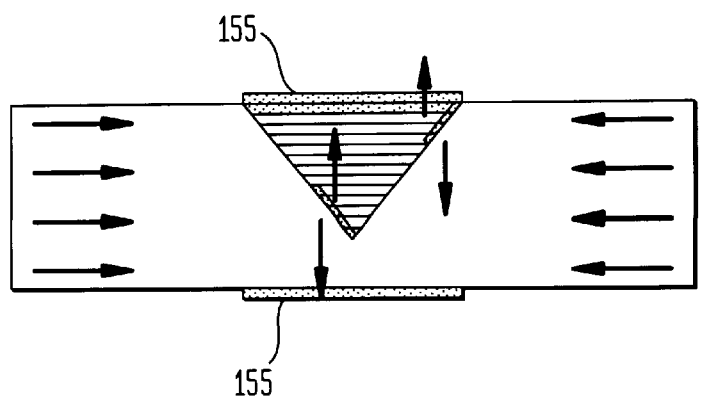
FIG. 1F is a cut-away view of a POF showing a light shutter within and covering the cut and refilled region for controllably emitting light and a light shutter on a side of the fiber opposite the cut and refilled region for controllablly emitting light out of that opposite side.

Finally, and with reference now to FIG. 1E, the light shutter is added to the optical fiber assembly shown in FIG. 1B. Specifically, dispersive elements 150 are placed in the cut and refilled region and covered with light shutter 155. As shown 10 in this Figure, light striking the mirrors is made diffuse upon striking the dispersive elements, and the now diffuse light is selectively emitted depending upon the state of the light shutter. A further embodiment of the light shutter is shown in FIG. 1F where a second light shutter is affixed to a side of the optical fiber opposite the cut and refilled region covered with the other light shutter. Such an arrangement permits the selective emission of light from the optical fiber through two opposite sides of the fiber thereby permitting, for example, a single optical fiber to be used in two-sided displays.

The light shutter may be preferably constructed from a liquid crystal structure. More specifically, the light shutter may be an array of liquid crystal elements and may selectively emit light of a particular wavelength. The liquid crystal elements may be interconnected in an array of rows and columns, which are addressed by pulsed signals. It should be further understood by those skilled in the art that the light shutter may be any structure which selectively permits the passage of emitted light such as a filter, polarizer, wave plate, etc. Indeed, the light shutter may even enhance the optical characteristics of the emitted light by acting as a lens.

Those skilled in the art will now readily recognize that a great variety of structures or devices may be utilized as light shutters to control the properties of the emitted light, e.g., brightness, color, polarization, etc. Such devices include, but are not limited to, thermal, mechanical, chemical, electrochemical and electrical modification of materials, either temporary or permanent, that alter the optical properties of the optical fiber, the refilled portion or both.

Materials used as dispersive elements or shutters may be broadly classified as reflective or transmissive elements. Examples of the latter include index-matching or index contrasting material used to fill the cut and refilled region. As those skilled in the art can appreciate, the light which encounters either the light dispersive elements or the light shutters may have its amplitude, phase, or polarization changed due to the interaction with the particular element.

Particular materials which diffract only one specific wavelength, so that they act more like a filter than a diffraction grating are particularly attractive. Such materials include Tellurium Dioxide (TeO$_2$).

Phase-modulation of the light may be converted to amplitude-modulation by a number of means familiar to those skilled in the art so that, e.g., a physical effect providing sensitive modulation of the phase of transmitted light, but little effect on the amplitude of the transmitted light. In a similar manner, changes in the polarization of light can be translated into brightness changes through the use of fixed polarizing elements.

The physical effect affecting material optical properties, and which may be used to control or modulate the emission of light from the dispersive optical fiber includes, but is not limited to electrical or magnetic modulation of the refractive index, polarization, and absorption. Optical modulation may also be used to control these parameters including, optical modulation of the refractive index or absorption through the photochromic effect.

The optical properties may also be controlled by mechanical effect such as "elasto-optical" effects, due to variation of the mechanical strain in the element, or due to scattering of density modulation in the material as well as thermal effects. The reflection-coefficient of reflective elements may be modified by any of these means and in addition, in some materials it is possible to switch the material from a reflective state to a non-reflective state. All such effects may occur in both crystalline as well as glassy or polymeric materials.

Further, the optical characteristics of the elements may be modulated by chemical or electrochemical means, which may or may not produce a permanent or irreversible chemical change in the material comprising the element, as for instance, a pH change to change the color of an indicator dye.

Figure 2A:
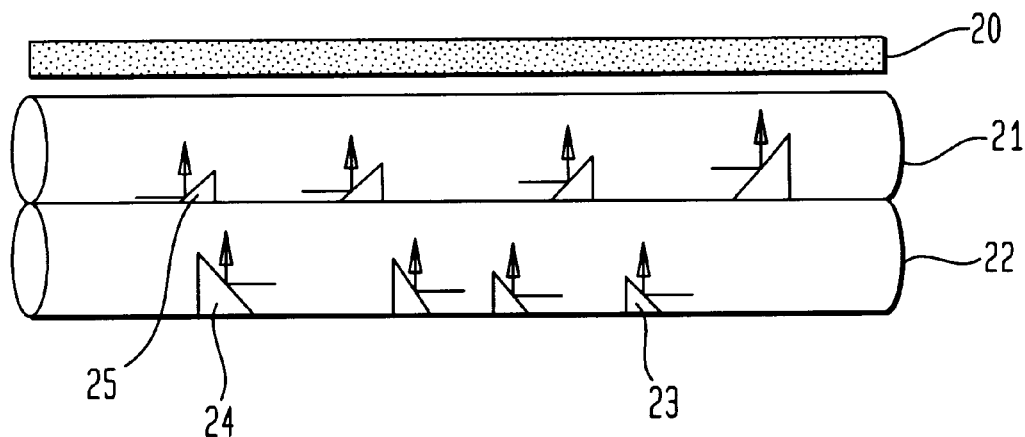
FIG. 2A is a side view of multiple side-emitting optical fibers stacked such that their combined intensity is enhanced.

With the above in mind and with reference now to FIG. 2A there is showns a stacked assembly of optical fibers 21 and 22. As can be seen, the optical fibers have imparted therein a number of internal mirrors 23, 24, 25 as described above such that light traversing either of the fibers is diverted out a side of the fiber toward light screen 20. As can be readily understood, a viewer positioned such that the screen was being observed, would view any light exiting from either of the optical fibers via the side and passing through the screen. In order to increase the intensity of the emitted light, and as depicted in this Figure, the cuts in the side of the optical fibers which form the internal mirrors and consequently cause the side emission of light, are vertically positioned such that the intensity of the emitted light is enhanced. For example, light traversing optical fiber 22 that strikes internal mirror 24 is deflected out a side of the optical fiber 22 such that it passes through optical fiber 21 before striking the screen 20. Side emitting optical fiber 21 has advantageously imparted therein an internal mirror 25 which is in sufficient vertical alignment with internal mirror 24 so that their combined emission is seen by an observer watching the screen. In this inventive manner, the intensity of the emitted light viewed by an observer is enhanced by adding additional optical fibers to the stack.

As should be readily apparent to those skilled in the art, the optical fiber closer to the screen (in this example 21) can further act as a cylindrical lens and thereby focus or otherwise enhance any light which exits optical fiber 22 which is further away from the screen. Consequently, highly sophisticated variations to the emitted light are possible by altering the geometry of any optical fiber(s) through which side emitted light passes before ultimately exiting the screen for viewing by an observer.

Figure 2B:
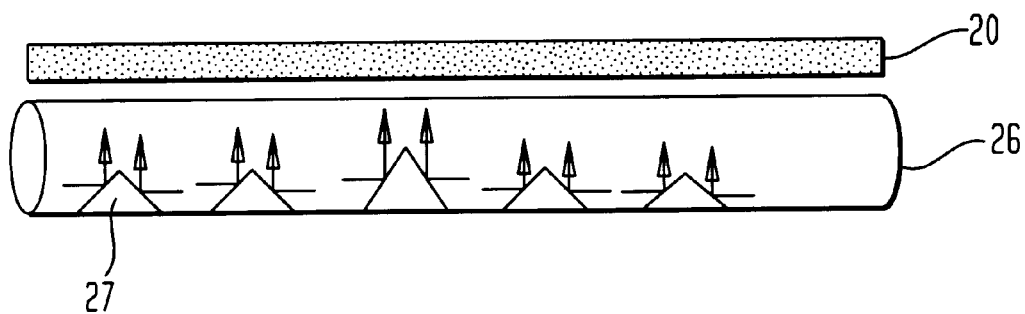
FIG. 2B is a side view of a side-emitting optical fiber wherein light to be emitted is conducted bi-directionally.

Turning our attention now to FIG. 2B, there it is shown that the above configuration may be enhanced by introducing light into the fiber so that it travels bi-directionally. Specifically, light entering optical fiber 26 from either end is deflected by internal mirror 27 so that it exits a side of the fiber. As can be appreciated, by supplying light from both ends of the fiber for subsequent side-emission, the intensity of the emitted light is advantageously enhanced and this enhancement can readily be applied to the stacked configuration shown in FIG. 2A.

Figure 3:
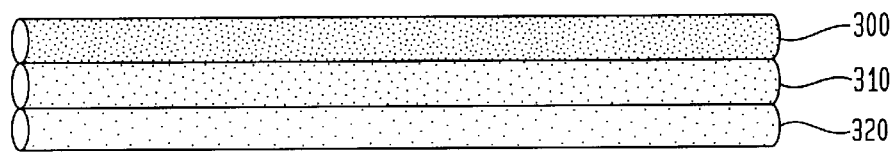
FIG. 3 shows three separate optical fibers having a different color of light in each fiber.
Figure 4:
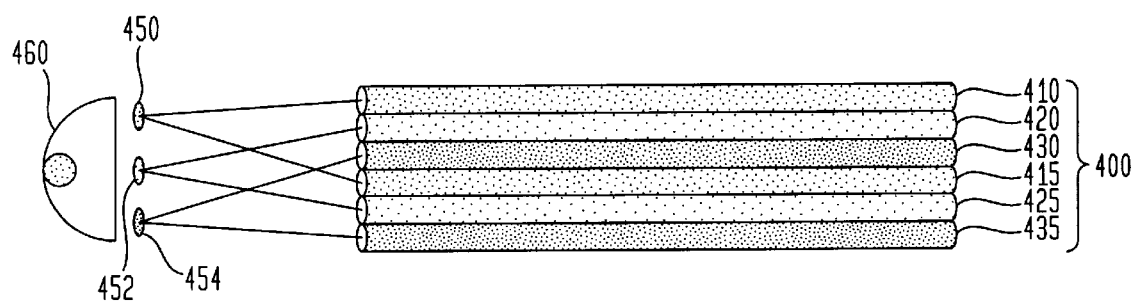
FIG. 4 shows three separate optical fibers each conducting a different color of light.
Figure 5:
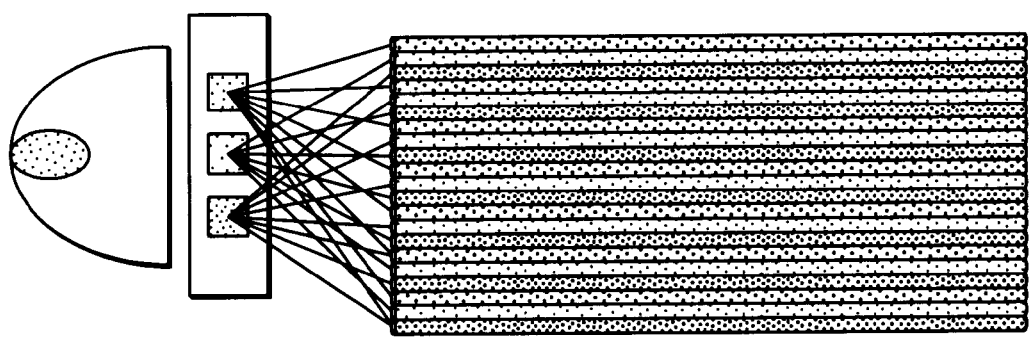
FIG. 5 shows three separate optical fibers each conducting a different color of light being injected from a single source separated by filters.
Figure 6:
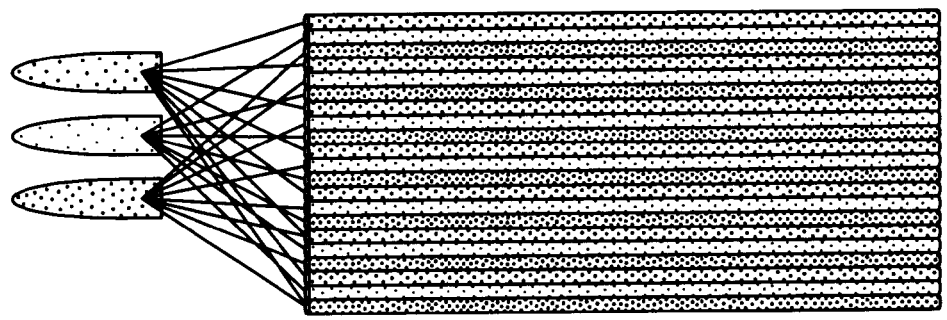
FIG. 6 shows three separate optical fibers each conducting a different color of light being injected from a high-efficiency light source and color separation devices.

With reference now to FIG. 3, there is shown three optical fibers 300, 310 and 320. While not explicitly shown in this Figure, light of different wavelengths (colors) may be conducted separately by each of the fibers. As can be seen now with reference to FIG. 4, six separate optical fibers 400 (two sets of three) 410, 420, 430, 415, 425, 435 are arranged into bundle 400. High intensity light source 460, which preferable emits light of a variety of wavelengths which subsequently passes through wavelength selectors (filters) 450, 452 454 for injection into particular optical fibers. With this arrangement, light of a particular wavelength is injected only into a particular fiber or fibers. As can be seen, the light filtered by filter 450 is injected into fibers 410 and 415, the light filtered by filter 452 is injected into fibers 420, 425 and the light filtered by filter 454 is injected into optical fibers 430 and 435. As can be readily appreciated, this configuration may be readily expanded into any number of distinct wavelengths of light and distinct fibers as shown further in FIG. 5. Still further, alternative light sources such as colored lasers may be used as well. This configuration allows great flexibility as the emitted light from any of the lasers utilized may be tunable such that a wide range of wavelengths are possible. FIG. 6 shows such a configuration where three lasers each emitting a different wavelength of light, i.e., Red, Green, Blue, 602, 604, 606 are shown injecting their emitted light into particular optical fibers.

Figure 7:
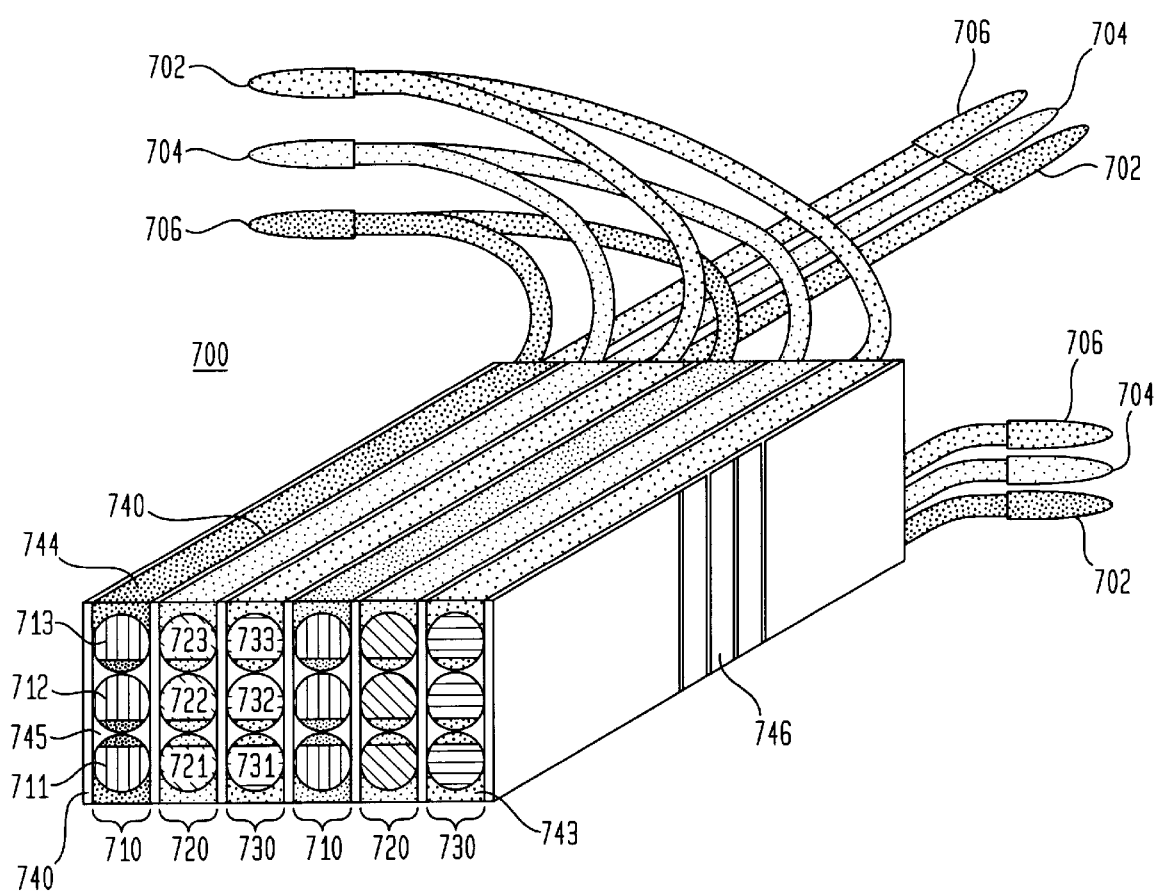
FIG. 7 shows three separate optical fibers each conducting a different color light being injected from three distinct, colored light sources such as lasers.

Turning now to FIG. 7, there is shown a colored backlight sub-system which uses the components previously described. Specifically, modular subsystem 700 comprises a plurality of optical fibers each connected to one of a plurality of light sources 702, 704, 706. As shown previously and as depicted in this Figure, there are shown three different colored light sources, i.e., Red, Green, and Blue lasers. The light emitted from the lasers are injected into particular ones of the optical fibers as before.

As shown in this Figure, the optical fibers are stacked into columns of three fibers wherein each column of fibers conducts a particular colored light. For example, column of fibers 710 includes fibers 711, 712, and 713, wherein each of these three fibers in the column conducts a particular colored light, i.e, Red. Similarly, column 720 includes three other optical fibers 721, 722 and 723 which likewise conduct a particular colored light. In this case, column 720 conducts Green light. Finally, column 730 includes still three other optical fibers 731, 732, and 733 which also conduct a particular colored light, i.e, Blue. In this manner, the three columns conduct three different colors of light useful for the backlight display, i.e., Red, Green and Blue. In a preferred assembly, the set of columns which include Red, Green and Blue conducting fibers is repeated in the subsystem as depicted in the FIG.

As can be seen from the Figure, each of the columns of fibers are isolated from each other by column isolators 740. As can be readily appreciated, the column isolators may be made from, or include a reflective layer adjacent to the column fibers which further enhances the optical output of the column.

In addition to the reflective channel isolators, channel reflectors 743, may be advantageously added to the bottom of the channel for increased optical output. For the sake of reference, the bottom of the channel is that portion of the channel which is further removed from a viewer who is observing light emitted from the optical fibers. As shown in the Figure, channel reflectors 743 are at the bottom of the channel, and channel diffuser 744 is positioned at the top of the channel. The purpose of the channel diffuser is to diffuse any light emitted from the channel of fibers.

Advantageously, cooling channels 745 are situated between each of the optical fibers in each of the channels. The cooling channels permit the positioning and/or circulation of materials which serve to absorb and conduct heat away from the optical fibers. As can be appreciated, when light is conducted by an optical fiber a small loss occurs which generates heat in the fiber. This heat loss may have a negative or detrimental effect on the performance of the backlight sub-system or liquid crystal layers which may be imparted thereon, therefore an effective and efficient means for removing the heat is required. As can be seen from this Figure, the cooling channel permits the removal of heat generated within the optical fibers.

Finally, and although not shown explicitly in the Figure, it is assumed that each of the optical fibers have been imparted with internal mirror assemblies so that they are side emitting, and preferably, side-emitting such that the emitted light is directed toward the top of each of the columns. (See, for example, FIG. 2A). Additionally, and as shown in FIG. 2A, the side emitting mirrors vertically aligned such that a lower mirror is not directly under the mirror in an overlying fiber. For example, a side emitting mirror in fiber 713 is not directly overlying a side emitting mirror in optical fiber 712 which in turn, is not directly overlying a side emitting mirror in optical fiber 711. Since the mirrors which are in a particular channel do not directly overlay one another, overlying fibers do not hinder the emission of light emitted from a lower fiber. Furthermore, with careful design, the overlying fiber may be of such a size and shape as to act as a cylindrical lens for light exiting from a lower fiber. In this inventive manner, the combined emitted light from a column of optical fibers is further enhanced.

Lastly, with respect to FIG. 7, the channel isolator on an edge of the sub-assembly is shown with electrical conductive strips 746 applied. These electrical conductive strips serve to provide conductive pathways from the top surface of the sub assembly to the bottom of the sub assembly. As will be apparent to those skilled in the art, a variety of methods are available for producing such conductive pathways.

Figure 8:
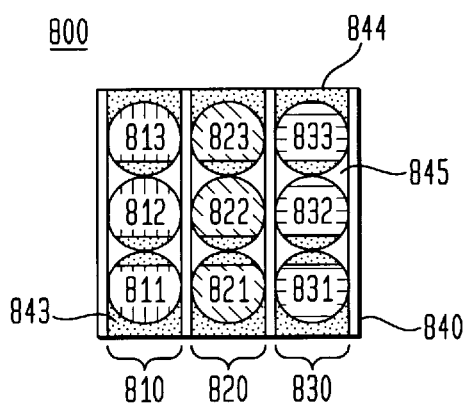
FIG. 8 shows a three by three array of separate optical fibers having a different color of light in each fiber, forming a display sub-module.

With reference now to FIG. 8, there is shown a cubic sub module, similar to the rectangular one shown in FIG. 7. Specifically, and as shown in the FIG, nine optical fibers 811,812,813, 821,822,823, 831,832 and 833 are arranged into three channels, 810, 820 and 830 each separated by reflective channel isolators 840. At a bottom of each one of the channels, is a channel reflector 843 which serves to reflect light emitted from the optical fibers in a particular channel toward a top of the channel where it may be diffused by diffuser 844 and subsequently viewed by an observer.

As before, each of the optical fibers in a particular channel conducts light of a particular wavelength (color) so that the output of the channel is light of that color. For example, channel 810 may be Red, channel 820 may be Green and channel 830 may be Blue. Finally, cooling channels 845, which conduct heat away from the optical fibers, are disposed between optical fibers in each of the channels.

Figure 9A:
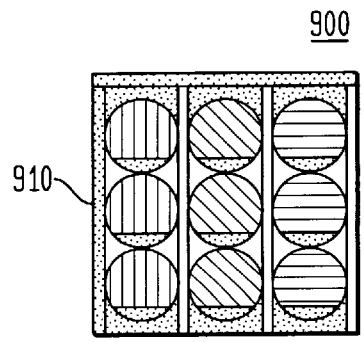
FIG. 9A shows the display sub-module of FIG. 8 used in a single-sided display.

As will be readily understood, there are many variations possible to the basic structure disclosed. In particular, both single sided and double sided displays are possible to construct with the basic backlight sub-module. With reference now to FIG. 9A, there is shown a single sided display constructed using the sub-module previously described.

Specifically, to the previously described sub-module 900, there is added side panel 910, which conveniently provides a mechanical interconnect for a plurality of sub-modules used to construct the display.

Figure 9B:
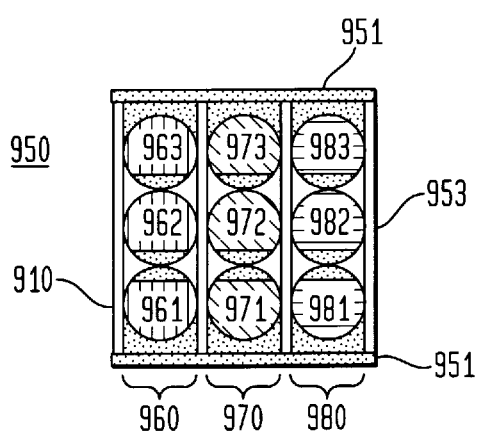
FIG. 9B shows the display sub-module of FIG. 8 used in a two-sided display.

Turning our attention now to FIG. 9B there is shown a sub-module suitable for a two sided display. Specifically, a three channel array each having three separate optical fibers comprise the sub-module. In this example, however, the side emitting regions of the fibers are constructed such that light is emitted out a top and bottom surface of the sub-module through light control panel 951 positioned on both top and bottom surfaces. Additionally, conductive ribbon 953 is disposed along a side of the module such that electrical contact may be made between the top and bottom surfaces as well as any intervening layers.

Figure 10:
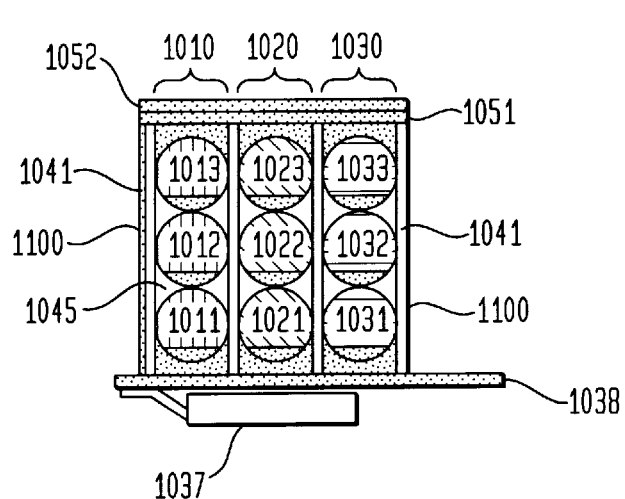
FIG. 10 shows the display sub-module of FIG. 8 in a single-sided display with surface detector.

With reference now to FIG. 10, there is shown a mini display module, constructed from the sub-module previously described. Specifically, optical fibers are aligned into channels, 1010, 1020, 1030 each having three stacked, side-emitting optical fibers wherein the light exiting a side of the fibers travels through any overlying fibers through a light shutter 1051, and light detector 1052 which may optionally be a side-receiving optical fiber constructed in a manner similar to the side-emitting optical fibers.

As with prior sub-modules, each channel of fibers carries light of a particular color and each of the channels are separated by a reflective channel isolator. Individual fibers in each of the channels are constructed such that cooling channels 1045 contact individual fibers. Outer sides of the module are constructed from conductive isolator 1100 which may optionally have conductive ribbon 1041 attached so that individual modules may combined thereby making a display of arbitrary size. Substrate 1038 provides mechanical and electrical support and contact with the display module and control unit 1037, of which a variety are well-known and whose function varies according to the application of a particular display.

Figure 11:
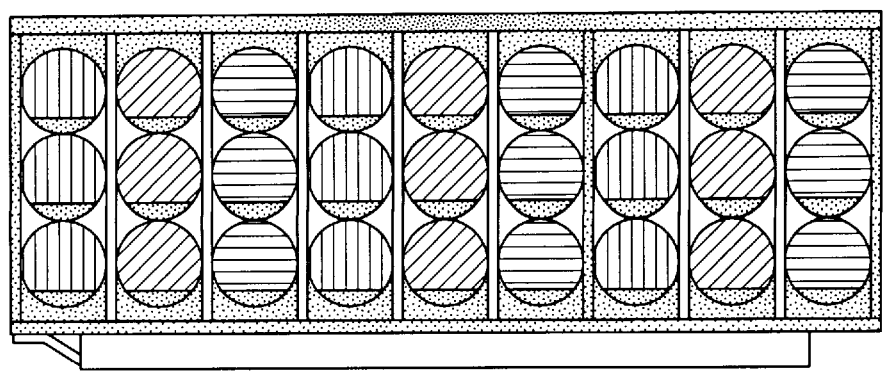
FIG. 11 shows the display sub-module of FIG. 8 cascaded together to form a larger display.

The extensibility and scalability of the present invention is shown in FIG. 11. There is shown 3 distinct display modules on a substrate so that one large display module is created which consists of 27 individual optical fibers. As can be readily appreciated, the invention of the present application may be arbitrarily sized, according to the particular application needs.

Clearly, it should now be quite evident to those skilled in the art, that while the invention was shown and described in detail in the context of a preferred embodiment, and with various modifications thereto, a wide variety of other modifications can be made without departing from scope of the inventive teachings. For example, well-known laser or other cutting devices may substitute for the mechanical knives uses and described. Similarly, the internal mirrors need not be flat, but rather could be any suitable shape. Therefore the invention should only be limited by the following claims.

We claim:

1. A high-intensity, fiber optic color backlight module for color displays comprising:
    a light source;
    a plurality of individual, side-emitting optical fibers arranged in parallel and connected to said light source thereby forming a first layer of optical fibers such that light emitted from the light source is conducted by the optical fibers and emitted out a side of the fibers; and
    a plurality of column isolators, one situated between each adjacent one of said individual side-emitting optical fibers, such that said column isolators isolate light emitted out from the side of each fiber of said first layer within said module and conduct said isolated light emitted from the side of each fiber out of said module.

2. The high-intensity, fiber optic color backlight module for color displays according to claim 1 further comprising:
    a light selection means, positioned between said light source and said individual side-emitting optical fibers such that adjacent optical fibers conduct and emit light of different color.

3. The high-intensity, fiber optic color backlight module for color displays according to claim 1 further comprising:
    one or more additional layers of side-emitting optical fibers, overlying said first layer of optical fibers such that each individual optical fiber within the additional layer is parallel with individual fibers in all underlying layers and situated between said column isolators thereby forming a vertical column of optical fibers wherein each one of said individual fibers in the vertical column of optical fibers conducts light of the same color.

4. The high-intensity, fiber optic color backlight module for color displays according to claim 3 further comprising:
    a reflective backing, positioned beneath said first layer of side emitting optical fibers.

5. The high-intensity, fiber optic color backlight module for color displays according to claim 4 further comprising:
    light shutter means, situated on a top of the vertical columns for selectively emitting the light emitted from the side emitting optical fibers within a particular vertical column of optical fibers.

6. The high-intensity, fiber optic color backlight module for color displays according to claim 5 further comprising:
    a light detector means, overlying each of said vertical columns, for detecting the light emitted from the vertical columns.

7. The high-intensity, fiber optic color backlight module for color displays according to claim 6 wherein each of said side-emitting optical fibers comprise a plurality of side-emitting ports and wherein the side-emitting ports of a fiber within a particular vertical column do not directly overlay the side-emitting ports of an underlying fiber such that the light emitted from a particular vertical column is enhanced.

8. The high-intensity, fiber optic color backlight module for color displays according to claim 7 wherein each side-emitting optical fiber within a particular vertical column of side-emitting optical fibers is a cylindrical lens for light emitted from underlying optical fibers.

9. The high-intensity, fiber optic color backlight module for color displays according to claim 1 wherein said light source further comprises a plurality of laser devices.

10. The high-intensity, fiber optic color backlight module for color displays according to claim 3 wherein each one of said side emitting optical fibers is a bi-directional, side emitting optical fiber such that light emitted from each of the vertical column is emitted out both a top and bottom of each column.

11. The high-intensity, fiber optic color backlight module for color displays according to claim 10 further comprising:
    a light shutter means situated on a top and a bottom of each vertical column, for selectively emitting the light emitted from the side emitting optical fibers within a particular vertical column of optical fibers.

12. The high-intensity, fiber optic color backlight module for color displays according to claim 11 further comprising:
    a light detector means, overlying and underlying each vertical column, for detecting the light emitted from a top and bottom of each vertical column.

13. The high-intensity, fiber optic color backlight module for color displays according to claim 12 wherein said light detector means is a side emitting optical fiber.

14. The high-intensity, fiber optic color backlight module for color displays according to claim 3 further comprising:
end column isolators, positioned adjacent an outermost column of optical fibers, having conductive strips disposed thereon for providing electrical conductivity from a top of a column of fibers to a bottom of a column of fibers.

15. The high-intensity, fiber optic color backlight module for color displays according to claim 3 further comprising:
a plurality of cooling channels, disposed between diagonally adjacent optical fibers and said column isolators.

16. The high-intensity, fiber optic color backlight module for color displays according to claim 15 wherein each of said cooling channels is circulated with a gas suitable for cooling each of said individual fibers.

17. The high-intensity, fiber optic color backlight module for color displays according to claim 15 wherein each of said cooling channels is circulated with a liquid suitable for cooling each of said individual fibers.

18. The high-intensity, fiber optic color backlight module for color displays according to claim 1 wherein a particular optical fiber conducts RED light, an adjacent optical fiber conducts GREEN light and a next adjacent optical fiber conducts BLUE light.

19. The high-intensity, fiber optic color backlight module for color displays according to claim 5 wherein said light shutter means is a liquid crystal display device.

20. The high-intensity, fiber optic color backlight module for color displays according to claim 5 wherein said light shutter means is a polarizing film.

21. A high-intensity, fiber optic color backlight module for color displays comprising:
a light source;
a plurality of individual, side-emitting optical fibers arranged in parallel and connected to said light source thereby forming a first layer of optical fibers such that light emitted from the light source is conducted by the optical fibers and emitted out a side of the fibers;
a plurality of column isolators, one situated between each adjacent one of said individual side-emitting optical fibers, such that said column isolators isolate light emitted from the side of each fiber of said first layer within said module and conduct said isolated light out of said module;
a light selection means, positioned between said light source and said individual side-emitting optical fibers such that adjacent optical fibers conduct and emit light of different color; and
one or more additional layers of side-emitting optical fibers, overlying said first layer of optical fibers such that each individual optical fiber within the additional layer is parallel with individual fibers in all underlying layers and situated between said column isolators thereby forming a vertical column of optical fibers wherein each one of said individual fibers in the vertical column of optical fibers conducts light of the same color.

22. The high-intensity, fiber optic color backlight module for color displays according to claim 21 further comprising:
a reflective backing, positioned beneath said first layer of side emitting optical fibers.

23. The high-intensity, fiber optic color backlight module for color displays according to claim 22 further comprising:
light shutter means, situated on a top of the vertical columns for selectively emitting the light emitted from the side emitting optical fibers within a particular vertical column of optical fibers.

24. The high-intensity, fiber optic color backlight module for color displays according to claim 23 further comprising:
a light detector means, overlying each of said vertical columns, for detecting the light emitted from the vertical columns.

25. The high-intensity, fiber optic color backlight module for color displays according to claim 24 wherein each of said side-emitting optical fibers comprise a plurality of side-emitting ports and wherein the side-emitting ports of a fiber within a particular vertical column do not directly overlay the side-emitting ports of an underlying fiber such that the light emitted from a particular vertical column is enhanced.

26. The high-intensity, fiber optic color backlight module for color displays according to claim 25 wherein each side-emitting optical fiber within a particular vertical column of side-emitting optical fibers is a cylindrical lens for light emitted from underlying optical fibers.

27. The high-intensity, fiber optic color backlight module for color displays according to claim 21 wherein each one of said side emitting optical fibers is a bidirectional, side emitting optical fiber such that light emitted from each of the vertical column is emitted out both a top and bottom of each column.

28. The high-intensity, fiber optic color backlight module for color displays according to claim 27 further comprising:
a light shutter means situated on a top and a bottom of each vertical column, for selectively emitting the light emitted from the side emitting optical fibers within a particular vertical column of optical fibers.

29. The high-intensity, fiber optic color backlight module for color displays according to claim 28 further comprising:
a light detector means, overlying and underlying each vertical column, for detecting the light emitted from a top and bottom of each vertical column.

30. The high-intensity, fiber optic color backlight module for color displays according to claim 29 wherein said light detector means is a side emitting optical fiber.

31. The high-intensity, fiber optic color backlight module for color displays according to claim 21 further comprising:
end column isolators, positioned adjacent an outermost column of optical fibers, having conductive strips disposed thereon for providing electrical conductivity from a top of a column of fibers to a bottom of a column of fibers.

32. The high-intensity, fiber optic color backlight module for color displays according to claim 21 further comprising:
a plurality of cooling channels, disposed between diagonally adjacent optical fibers and said column isolators.

33. The high-intensity, fiber optic color backlight module for color displays according to claim 32 wherein each of said cooling channels is circulated with a gas suitable for cooling each of said individual fibers.

34. The high-intensity, fiber optic color backlight module for color displays according to claim 32 wherein each of said cooling channels is circulated with a liquid suitable for cooling each of said individual fibers.

35. The high-intensity, fiber optic color backlight module for color displays according to claim 23 wherein said light shutter means is a liquid crystal display device.

36. The high-intensity, fiber optic color backlight module for color displays according to claim 23 wherein said light shutter means is a polarizing film.

37. A high-intensity, fiber optic color backlight module for color displays comprising:
a light source;

a plurality of individual, side-emitting optical fibers arranged in parallel and connected to said light source thereby forming a first layer of optical fibers such that light emitted from the light source is conducted by the optical fibers and emitted out a side of the fibers; and a plurality of column isolators, one situated between each adjacent one of said individual side-emitting optical fibers, such that said column isolators isolate light emitted from the side of each fiber of said first layer within said module and conduct said isolated light out of said module, wherein a particular optical fiber conducts RED light, an adjacent optical fiber conducts GREEN light and a next adjacent optical fiber conducts BLUE light.

* * * * *